United States Patent [19]
Matsumoto et al.

[11] Patent Number: 5,730,926
[45] Date of Patent: Mar. 24, 1998

[54] METHOD FOR THE NON-RESIN FLUID-ASSISTED INJECTION MOLDING OF A RESIN

[75] Inventors: Yuichi Matsumoto; Maki Horikoshi, both of Kawasaki; Shoji Imai, Itabashi-ku, all of Japan

[73] Assignee: Asahi Kasei Kogyo Kabushiki Kaisha, Osaka, Japan

[21] Appl. No.: 722,104

[22] PCT Filed: Sep. 2, 1994

[86] PCT No.: PCT/JP94/01457

§ 371 Date: Oct. 3, 1996

§ 102(e) Date: Oct. 3, 1996

[87] PCT Pub. No.: WO96/02379

PCT Pub. Date: Feb. 1, 1996

[30] Foreign Application Priority Data

Jul. 15, 1994 [JP] Japan .................... 6-185185

[51] Int. Cl.⁶ .......................... B29C 45/00; B29C 45/17
[52] U.S. Cl. .......................... 264/500; 425/130
[58] Field of Search .................... 264/500, 572; 425/130

[56] References Cited

U.S. PATENT DOCUMENTS

| | | | |
|---|---|---|---|
| 4,948,547 | 8/1990 | Hendry | 264/500 |
| 5,344,596 | 9/1994 | Hendry | 264/500 |
| 5,439,365 | 8/1995 | Hendry | 264/572 |
| 5,643,527 | 7/1997 | Carroll | 264/500 |

FOREIGN PATENT DOCUMENTS

| | | |
|---|---|---|
| 50-075247 | 6/1975 | Japan . |
| 3224719 | 10/1991 | Japan . |
| 4062125 | 2/1992 | Japan . |
| 5038721 | 2/1993 | Japan . |
| 9006220 | 6/1990 | WIPO . |
| 9314918 | 8/1993 | WIPO . |

*Primary Examiner*—Catherine Timm
*Attorney, Agent, or Firm*—Birch, Stewart, Kolasch & Birch, LLP

[57] ABSTRACT

A method for the non-resin fluid-assisted injection molding of a resin to produce a shaped resin article having an improved surface finish, which comprises effecting an excess filling of a mold cavity of a sealed mold with a molten resin to form a molten resin mass having opposite, first and second surfaces respectively facing opposite inner walls of the mold cavity, wherein the excess filling is performed in a specific excess filling ratio which corresponds to an excess ratio of a resin by an amount corresponding to 30 to 90% of the difference between the volume of the mold cavity and the volume exhibited by the resin in accordance with the shrinkage thereof when the molten resin filled in the mold cavity is cooled to room temperature, and subsequently introducing a pressurized non-resin fluid into the mold cavity on a side of the first surface of the molten resin mass to thereby press the second surface of the molten resin mass against the cavity inner wall remote from the side of the introduction of the non-resin fluid. By the non-resin fluid-assisted injection molding method of the present invention, the occurrence of a sink mark on a front surface of a shaped resin article can be effectively prevented without causing the problem of the occurrence of burrs (flashes).

11 Claims, 7 Drawing Sheets

METHOD FOR THE NON-RESIN FLUID-ASSISTED INJECTION MOLDING OF A RESIN

BACKGROUND OF THE INVENTION

1. Field of the Invention

The present invention relates to a non-resin fluid-assisted injection molding method. More particularly, the present invention is concerned with a method for the non-resin fluid-assisted injection molding of a resin to produce a shaped resin article having an improved surface finish, wherein an excess filling of a mold cavity with a specific amount of a molten resin is effected to form a molten resin mass having opposite, first and second surfaces respectively facing opposite inner walls of the mold cavity, and a pressurized non-resin fluid is subsequently introduced into the mold cavity on a side of the first surface of the molten resin mass to thereby press the second surface of the molten resin mass against the cavity inner wall remote from the side of the introduction of the non-resin fluid. By the non-resin fluid-assisted injection molding method of the present invention, the occurrence of a sink mark on a front surface of a shaped resin article can be prevented without causing the problem of the occurrence of burrs (flashes) thereon. The non-resin fluid-assisted injection molding method of the present invention is especially effective for producing a shaped resin article which has, on a front surface thereof, a locally protruded portion, at which the shaped resin article has an increased thickness, such as a rib, a boss or the like.

2. Discussion of Related Art

It is widely known that when a shaped resin article which has a relatively large thickness or has a locally protruded portion on a back surface thereof is produced by injection molding a molten resin, a dent, i.e., the so-called "sink mark," is likely to occur on a front surface of the shaped resin article in accordance with the volume shrinkage of the molten resin during the cooling thereof. For preventing the occurrence of a sink mark on a front surface of a shaped resin article, a method has conventionally been known, wherein when an injection pressure is applied, an increased level of pressure is used, and, after the injection, the application of pressure is continued while cooling the injected molten resin (this method is hereinafter referred to as "resin pressure method".). In this resin pressure method, the applied injection pressure is generally in the range from 500 to 2,000 kgf/cm² in terms of the maximum resin pressure in the mold cavity.

However, as described in Japanese Patent Application Laid-Open Specification No. 50-75247, the above-mentioned resin pressure method has problems. For example, it is difficult to appropriately apply pressures in two stages so as to achieve the effects aimed at by the resin pressure method, so that the molding operation tends to become cumbersome and time-consuming. Furthermore, in the resin pressure method, the shaped resin articles produced are likely to have burrs formed along a parting line of the mold. Therefore, the removal of the burrs is necessary, thereby inevitably causing a problem such that additional work on steps are necessary in a molding operation. On the other hand, when a relatively low pressure is employed in the resin pressure method in order to prevent the occurrence of burrs, sink marks are likely to occur at a portion of a shaped resin article, which is positioned away from a gate in a mold cavity, i.e., a portion on which a satisfactory resin pressure cannot be obtained.

For solving the problems of the resin pressure method, the above-mentioned Japanese Patent Application Laid-Open Specification No. 50-75247 proposes a gas-assisted injection molding method in which a mold is used which comprises a fixed mold half and a movable mold half with its inner wall having a core protruding therefrom toward the inner wall of the fixed mold half, so that a concave mold cavity defined by the fixed mold half and the movable mold half having the core portion is provided. The core has a hole extending in the direction of the longitudinal axis thereof, and the hole has a poppet valve disposed at the top thereof. In this method, after a molten resin has been injected into a mold cavity, the poppet valve is operated to push up the molten resin mass, so that a space is produced between the core and the inner surface of the concave molten resin mass formed in the concave mold cavity, and then a pressurized gas is injected through the poppet valve into the above-mentioned space, thereby pressing the outer surface of the molten resin mass against the cavity inner wall remote from the core. This gas-assisted injection molding method is intended to prevent the occurrence of sink marks by using a pressurized gas, instead of using the two-stage application of pressure as in the above-mentioned resin pressure method which, as described above, is likely to be unfavorably accompanied by the occurrence of burrs along a parting line of a mold cavity. In Japanese Patent Application Laid-Open Specification No. 50-75247, there is no description about the amount of molten resin to be injected.

WO 90/06220 (corresponding to U.S. Pat. No. 5,273,707 and EP No. 400135) discloses a gas-assisted injection molding method in which a molten resin is injected into the mold cavity in a volume smaller than the volume of the mold cavity, specifically in a volume of 90% to 95% of the volume of the mold cavity, and then a pressurized gas is introduced into the remaining space in the cavity. However, a gap is likely to be formed between the inner wall (remote from the side of the gas introduction) of the mold cavity and the molten resin injected into the mold cavity. Hence, the gas intrudes into the gap, causing the occurrence of sink marks.

As is apparent from the above, in the conventional gas-assisted injection molding methods, for preventing the occurrence of burrs and for assuring a space in a mold cavity into which a pressurized gas is to be introduced, a molten resin is injected into a mold cavity in a volume equal to or smaller than the volume of the mold cavity.

International Patent Application Publication No. WO 93/14918 discloses the use of a mold having a sealed construction in which not only a parting line between a movable mold half and a fixed mold half, but also a space between an ejector pin and an inner wall of an ejector pin slide hole provided in the movable mold half, is sealed. In addition, this patent document teaches that a weir formed of a protrusion (having, for example, a rib-like configuration) is provided around a portion of the inner wall of a mold cavity on which it is intended to receive a gas pressure, so that a gas pressure can be effectively applied to a desired portion of an injected molten resin for preventing the occurrence of a sink mark.

However, with the use of the mold having a sealed construction and with the provision of the weir, it is impossible to prevent an unfavorable intrusion of a pressurized gas into a portion of the mold cavity on a side of the surface of an injected molten resin mass which surface should be pressed against a cavity inner wall facing it. Therefore, close contact between the above-mentioned surface of the molten resin mass and the cavity inner wall facing it cannot be achieved, resulting in an unsatisfactory surface finish of the resultant shaped resin article. In addition, since a weir is provided on the inner wall of the mold cavity, the freedom of design of a shaped article to be produced is inevitably limited. Further, it is noted that in International Patent Application No. WO 93/14918, it is described that the mold cavity is filled or nearly filled with a molten resin.

Recently, large-size shaped articles, such as automobile parts and casings of home electric appliances, have been in increasing demand. In order that the production cost may be reduced by rendering it unnecessary to conduct finishing works, such as painting and plating, it has been desired to produce a shaped resin article having an excellent surface finish, in which a sink mark is suppressed to a visually unnoticeable level and which exhibits excellent and uniform gloss and luster.

However, as described hereinabove, in the conventional injection molding methods, when a shaped resin article to be produced has a locally protruded portion on a back surface thereof at which the article has an increased thickness, the occurrence of a sink mark defect on a front surface thereof at a portion corresponding to the locally protruded portion cannot be satisfactorily suppressed without causing the problem of the occurrence of burrs.

SUMMARY OF THE INVENTION

From the above context, the present inventors have made extensive and intensive studies with a view toward solving the above-mentioned problems inevitably accompanying the prior art methods.

As a result of the above studies, it has unexpectedly been found that, in a method for the non-resin fluid-assisted injection molding of a resin, when an excess filling of the mold cavity of a sealed mold with a molten resin is effected, under preselected temperature and pressure conditions for the injection, in a specific excess filling ratio [corresponding to an excess ratio of resin by an amount corresponding to 30 to 90% of the difference between the volume of the mold cavity and the volume exhibited by the resin in accordance with the shrinkage thereof when the molten resin filled in the mold cavity is cooled to room temperature], to thereby form a molten resin mass having opposite, first and second surfaces, and a pressurized non-resin fluid is introduced into the mold cavity on a side of the first surface of the molten resin mass to thereby press the molten resin mass against a cavity inner wall facing the second surface (which cavity inner wall is remote from the side of the introduction of the non-resin fluid), the occurrence of a sink mark can be effectively prevented without the occurrence of a burr, thereby producing a shaped resin article having an excellent surface finish. Based on this novel finding, the present invention has been completed.

Accordingly, it is a primary object of the present invention to provide a novel method for the non-resin fluid assisted injection molding of a resin, which is free not only from the occurrence of a sink mark, but also from the occurrence of burrs, and which is therefore extremely useful for producing a shaped resin article having an improved surface finish.

The foregoing and other objects, features and advantages of the present invention will be apparent to those skilled in the art from the following detailed description and appended claims taken in connection with the accompanying drawings.

BRIEF DESCRIPTION OF THE DRAWINGS

In the accompanying drawings:

In FIG. 1 through FIG. 10, like parts or portions are designated by like numerals and characters.

DETAILED DESCRIPTION OF THE INVENTION

According to the present invention, there is provided a method for the non-resin fluid-assisted injection molding of a resin to produce a shaped resin article having an improved surface finish, which comprises:

(1) providing a mold comprising a fixed mold half and a movable mold half mating with the fixed mold half to thereby provide a mold cavity defined by an inner wall of the fixed mold half and an inner wall of the movable mold half, the mold cavity communicating with a resin inlet and with a non-resin fluid inlet, the mold being sealed to prevent a non-resin fluid from leakage out of the mold when the non-resin fluid is introduced to the mold cavity;

(2) injecting a resin in a molten form, under preselected temperature and pressure conditions for the injection, into the mold cavity of the mold through the resin inlet in an amount ($W_2$) represented by the following formula (I):

$$W_2(g) = W_1(g) + W_x(g) \tag{I}$$

wherein:

$W_1$ is defined by formula $W_1 = \rho \cdot V_1$ in which $\rho$ is the density (g/cm$^3$) of the resin as measured at room temperature under atmospheric pressure, and $V_1$ is defined by formula $V_1 = V_0 \cdot (1-x)$ in which $V_0$ is the volume (cm$^3$) of the mold cavity, and x is the volume shrinking ratio of the resin, the volume shrinking ratio being defined by the formula $$\frac{V_a - V_b}{V_a}$$

in which $V_a$ is the volume (cm$^3$) of a predetermined weight of the resin in a molten form under the preselected temperature and pressure conditions for the injection, and $V_b$ is the volume (cm$^3$) of the predetermined weight of the resin in a solidified form upon cooling to room temperature; and $W_x$ is defined by formula (II):

$$W_x = \rho \cdot y \cdot (V_0 - V_1) \qquad \text{(II)}$$

wherein $\rho$ is as defined above, Y is from 0.3 to 0.9, and $V_0$ and $V_1$ are as defined above,
thereby effecting an excess filling of the mold cavity with the molten resin to form a molten resin mass having opposite, first and second surfaces respectively facing opposite inner walls of the cavity; and (3) introducing a pressurized non-resin fluid, which is inert to the resin, into the mold cavity on a side of the first surface of the molten resin mass to thereby press the second surface of the molten resin mass against the cavity inner wall facing said second surface.

Hereinafter, the method of the present invention will be described in detail, with reference to FIG. 1 through FIG. 10.

In step (1) of the method of the present invention, a mold is provided. The mold is usually made of a metallic material, e.g., steel.

Figure 1:
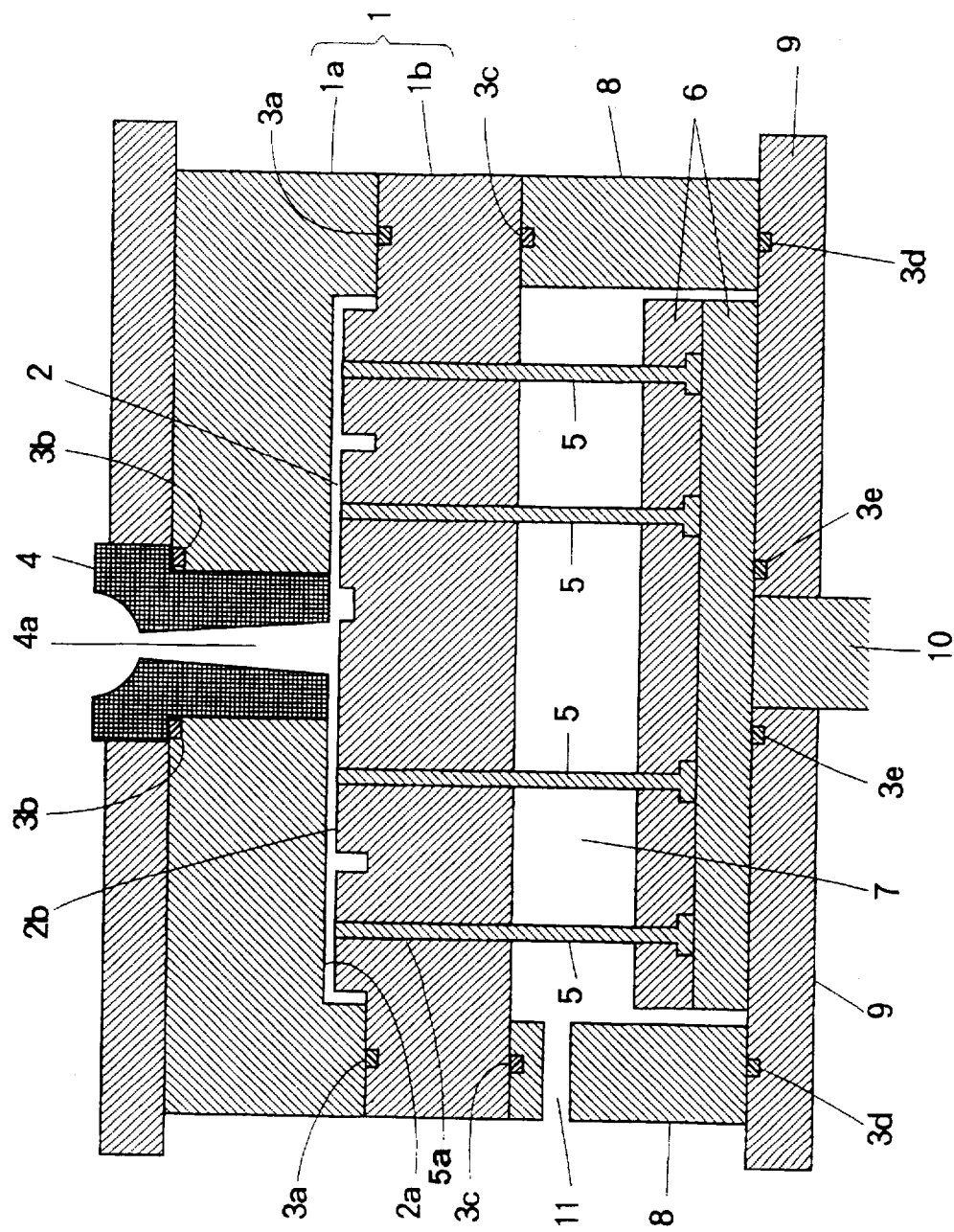
FIG. 1 is a diagrammatic cross-sectional view of one form of a sealed mold to be used in the present invention.

FIG. 1 shows one form of a mold to be used in the present invention. As shown in FIG. 1, mold 1 to be used in the method of the present invention comprises fixed mold half 1a and movable mold half 1b mating with fixed mold half 1a to thereby provide mold cavity 2 defined by inner wall 2a of fixed mold half 1a and inner wall 2b of movable mold half 1b. Mold cavity 2 communicates with a resin inlet (sprue 4a of sprue bush 4) and with a non-resin fluid inlet. Mold 1 is sealed by means of seal means 3a to 3e to prevent a non-resin fluid from leakage out of mold 1 when the non-resin fluid is introduced to mold cavity 2. Each of seal means 3a to 3e can be an O-ring made of rubber. With respect to mold 1, on a side of movable mold half 1b, remote from mold cavity 2, is provided sealed chamber 7 which is defined by an outer wall of movable mold half 1b, an inner wall of spacer block 8 and an inner wall of bottom plate 9. Sealed chamber 7 contains ejector pin-supporting plate 6 and a plurality of ejector pins 5 each securely connected to ejector pin-supporting plate 6 on a side of movable mold half 1b as depicted in FIG. 1, and movable mold half 1b has a plurality of ejector pin slide holes 5a, respectively, slidably receiving the plurality of ejector pins 5 therein. Ejector pin-supporting plate 6 is made by connecting two plates to each other by means of, for example, bolts and nuts. Each ejector pin 5 passes through ejector pin slide hole 5a and extends between mold cavity 2 and sealed chamber 7, so that a non-resin fluid channel is provided between an inner wall of each ejector pin slide hole 5a and a longitudinally extending periphery of each ejector pin 5, and each ejector pin 5 has its forward end exposed to mold cavity 2. Ejector pin-supporting plate 6 is securely connected, on a side thereof opposite to the side thereof having the plurality of ejector pins 5, to pushing rod 10 for pushing ejector pin-supporting plate 6.

The non-resin fluid channel has an open end in inner wall 2b of movable mold half 1b, which open end serves as the non-resin fluid inlet.

Sealed chamber 7 communicates fluid-tightly with mold cavity 2 through the non-resin fluid channel, and communicates with a source (not shown) for the pressurized non-resin fluid through port 11. The pressurized non-resin fluid is introduced into and withdrawn from mold cavity 2 through port 11, sealed chamber 7 and the non-resin fluid channel.

Rod 10 for pushing ejector pin-supporting plate 6 is reversibly movable. After a shaped resin article has been produced in mold cavity 2, movable mold half 1b having the shaped resin article attached to its inner wall 2b is separated from fixed mold half 1a to open mold 1. Next, rod 10 is moved to push ejector pin-supporting plate 6 toward movable mold half 1b, so that the forward ends of the plurality of ejector pins 5 connected to ejector pin-supporting plate 6 are caused to protrude outwardly of ejector pin slide holes 5a, thereby ejecting the shaped resin article from movable mold half 1b.

More specifically, mold 1 to be used in the method of the present invention is a mold which is able to be kept in a fluid-tightly sealed state for the period of time from the injection in step (2) to the solidification of the molten resin by cooling. In the present invention, the term "fluid-tightly sealed state" means a state in which a fluid is prevented from leakage out of mold 1 except that the pressurized non-resin fluid can be introduced into and withdrawn out of mold cavity 2 through the non-resin fluid inlet.

In mold 1 of FIG. 1, in order to achieve the sealing of the mold, seal means 3a to 3e are provided, as shown in FIG. 1. Seal means 3a is for sealing a parting line between fixed mold half 1a and movable mold half 1b. Seal means 3b is for sealing an interface between fixed mold half 1a and sprue bush 4. Seal means 3c is for sealing an interface between movable mold half 1b and spacer block 8. Seal means 3d is for sealing an interface between spacer block 8 and bottom plate 9. Seal means 3e is for sealing an interface between ejector pin-supporting plate 6 and bottom plate 9.

With respect to mold 1 of FIG. 1, since the pressurized non-resin fluid is to be introduced into mold cavity 2 from the side of movable mold half 1b, to thereby press the second surface of the molten resin against inner wall 2a of fixed mold half 1a, seal means 3b on the side of fixed mold half 1a can be omitted.

In step (2) of the method of the present invention, a resin is injected in a molten form, under preselected temperature and pressure conditions for the injection, into mold cavity 2 of mold 1 through the resin inlet (sprue 4a) in an amount ($W_2$) represented by the formula: $W_2(g) = W_1(g) + W_x(g)$ wherein $W_2$, $W_1$ and $W_x$ are as defined above, thereby effecting an excess filling of the mold cavity 2 with the molten resin, so that opposite, first and second surfaces of the resultant molten resin mass do, respectively, closely face opposite inner walls 2b, 2a of mold cavity 2.

In step (3) of the method of the present invention, a pressurized non-resin fluid is introduced into mold cavity 2 on a side of the first surface of the molten resin mass to thereby press the second surface of the molten resin mass against cavity inner wall 2a facing the second surface.

In the conventional gas-assisted injection molding method, an excess-filling of a mold cavity with a molten resin is avoided in an attempt to solve the problem of the resin pressure method, i.e., the occurrence of burrs along a parting line which is caused by an excess filling effected in the resin pressure method for applying an increased resin pressure.

However, one of the most characteristic features of the method of the present invention is to effect an excess filling of the mold cavity with the molten resin in a specific filling ratio. The reason why a mold cavity can be filled in excess with a molten resin resides in that a molten resin can be compressed by the action of the continued application of injection pressure.

The reason why the injection of an excess amount of a molten resin (i.e., an excess filling of the mold cavity) is effective is as follows. When a pressurized non-resin fluid is introduced into the excess-filled mold cavity on a side of the first surface of the molten resin mass, the pressurized non-resin fluid is completely prevented from flowing and intruding into a portion of the mold cavity on the side of the second surface of the molten resin mass. Therefore, the entire area of the second surface of the molten resin mass in the mold cavity can be pressed closely against the cavity inner wall facing the second surface, so that a shaped resin article having an improved surface finish can be produced.

A person skilled in the art may presume that after an excess amount of a molten resin has been injected into a mold cavity, there would be no space left in the mold cavity, so that even if it is attempted to introduce a pressurized non-resin fluid into the mold cavity on a side of the first surface of the molten resin mass in step (3), the introduction of the non-resin fluid would be difficult, or the pressure of the pressurized non-resin fluid can be exerted only on limited portions of the first surface of the molten resin mass. Thus, a person skilled in the art may presume that it would be impossible to press the entire area of the second surface of the molten resin mass closely against the cavity inner wall facing the second surface.

However, it has unexpectedly, surprisingly been found by the present inventors that such a problem as described above does not occur in step (3) of the method of the present invention as long as the degree of excess filling is within the range as specified in the present invention and that the pressurized non-resin fluid introduced into the mold cavity on a side of the first surface of the molten resin mass successfully serves to uniformly press the entire area of the second surface of the molten resin mass against the cavity inner wall facing the second surface, with satisfactory force. Further, although it is generally known that the larger the amount of a more molten resin to be injected into a mold cavity, the more likely will be the occurrence of burrs, the present inventors have for the first time found that even when an excess filling of a mold cavity with a molten resin is effected, the occurrence of burrs can be well prevented by using a sealed mold as long as the degree of excess filling is within the range as specified in the present invention.

As mentioned above, in step (2) of the method of the present invention, a resin is injected in a molten form, under preselected temperature and pressure conditions for the injection, into the mold cavity of the mold through the resin inlet in an amount ($W_2$) represented by the following formula (I):

$$W_2(g) = W_1(g) + W_x(g) \qquad (I)$$

In formula (I), $W_1(g)$ represents weight of the molten resin which fills (not excess-filling) the mold cavity under the preselected temperature and pressure conditions for the injection, without being compressed. $W_x(g)$ in formula (I) represents an excess portion of the amount [$W_2(g)$] of the molten resin to be injected. $W_1$ can be determined, for example, by the following method. First, a relatively small weight amount of the resin is injected in a molten form, under the preselected temperature and pressure conditions for the injection, into the mold cavity of the mold through the resin inlet, followed by injection molding, to thereby confirm that the injected molten resin does not yet fill the mold cavity. (With respect to the appropriate temperature and pressure conditions for the injection, when the resin is, for example, polystyrene, the temperature is generally in the range from 190° to 250° C., and the pressure is generally in the range from 500 to 2,000 kgf/cm².) The injection molding is repeated while gradually, slightly increasing the weight of the resin, until it can be confirmed that the injected molten resin fills the mold cavity, without being compressed. The thus determined weight of the resin can be used as $W_1$ in formula (I).

As mentioned above, $W_x$ (g) is defined by formula (II):

$$W_x = \rho \cdot Y \cdot (V_0 - V_1) \qquad (II)$$

wherein $\rho$ is as defined above, Y is from 0.3 to 0.9, and $V_0$ and $V_1$ are as defined above.

In formula (II), Y corresponds to an excess filling ratio. When Y is expressed in terms of weight percentage, the excess filling ratio in the present invention is in the range from 30% to 90%. The excess filling ratio is preferably in the range from 50% to 80%.

When the excess filling ratio is less than 30%, the pressurized non-resin fluid introduced is likely to intrude into a portion of the mold cavity on a side of the second surface of the molten resin mass, so that the pressurized non-resin fluid cannot satisfactorily press the entire area of the second surface of the molten resin mass sufficiently against the cavity inner wall facing the second surface and, therefore, it becomes difficult to obtain a uniformly improved surface finish of a shaped resin article. On the other hand, when the excess filling ratio exceeds 90%, burrs are likely to occur. For removal of the burrs, time-consuming finishing steps are needed. Further, when the excess filling ratio exceeds 90%, there is a danger that the mold would sustain damage. In addition, the uniformity of the surface finish of a shaped resin article is deteriorated since the transfer of the configuration of the cavity inner wall facing the second surface of the molten resin mass to the second surface of the molten resin mass is locally, excessively urged. However, when the excess filling ratio is in the range from 30% to 90%, especially from 50% to 80%, the occurrence of sink marks can unexpectedly be reduced to a visually unnoticeable level, without causing the occurrence of burrs and a non-uniform surface finish. With respect to the resin to be employed in the present invention, there is no particular limitation. The resin to be used in the method of the present invention can be selected from those which are generally employed in the conventional injection molding method and the extrusion molding method. Examples of resins which can be used in the method of the present invention include thermoplastic resins, such as polystyrene, an acrylonitrile/butadiene/styrene terpolymer resin, an acrylonitrile/styrene copolymer resin, a methacrylate resin, an acetal resin, polyethylene, polyamide, polycarbonate, modified polyphenylene ether and polyphenylene sulfide; and thermosetting resins. The resin to be used in the present invention may contain various types of customary additives, such as plasticizers; stabilizers; ultraviolet absorbers; colorants; mold release agents; fibrous reinforcing agents, such as glass fibers and carbon fibers; and fillers, such as glass beads, calcium carbonate and talc. These additives can be used in such amounts as are usually employed in the art.

Hereinbelow, step (3) of the method of the present invention, i.e., the introduction of the pressurized non-resin fluid, will be explained in detail.

Referring now to FIG. 1, after completion of step (2), a pressurized non-resin fluid, which is inert to the resin, is introduced into mold cavity 2 on a side of the first surface of the molten resin mass to thereby press the second surface of the molten resin mass against cavity inner wall 2a facing the second surface. Step (3) can be conducted immediately after step (2). Alternatively, there may be an appropriate time lag between step (2) and step (3) as long as step (3) is conducted before the molten resin mass solidifies.

In the case of mold 1 of FIG. 1, when the pressurized non-resin fluid is supplied from a source (not shown) for a non-resin fluid, the pressurized non-resin fluid enters sealed chamber 7 from non-resin fluid port 11.

Examples of non-resin fluids usable in the present invention include a substance which is gaseous at room temperature, such as nitrogen, air, carbon dioxide and argon; and a substance which is liquid at room temperature, such as water. An inert gas, such as nitrogen, is preferable. The appropriate pressure of the pressurized non-resin fluid varies depending on several factors, such as the type of resin used, and the shape and size of the shaped article to be produced. However, the pressure of the non-resin fluid is generally in the range from 5 to 100 kg/cm² G.

By increasing the pressure of the pressurized non-resin fluid in sealed chamber 7, the pressurized non-resin fluid in sealed chamber 7 is introduced into mold cavity 2 through a non-resin fluid channel formed between the inner wall of each ejector pin slide hole 5a and the longitudinally extending periphery of each ejector pin 5. More specifically, the pressurized non-resin fluid is introduced into mold cavity 2 on a side of the first surface of the molten resin mass facing cavity inner wall 2b. As a result, the second surface of the molten material mass is pressed against the cavity inner wall 2a facing the second surface. Thus, upon cooling to solidify the molten resin mass, a shaped article having an improved surface finish, i.e., a shaped article which exhibits excellent gloss and luster and an excellent reproduction of the configuration of cavity inner wall 2a and which is free from sink marks, can be obtained.

Figure 2A:
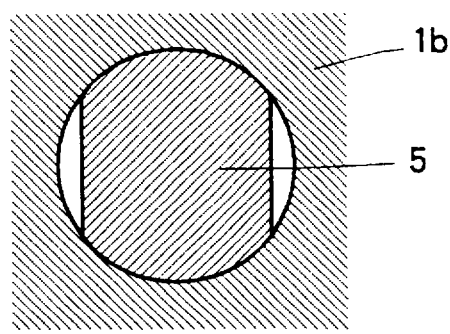
FIG. 2(a) and FIG. 2(b) are enlarged diagrammatic cross-sectional views of two forms of the ejector pin, shown with ejector pin slide holes, respectively, slidably receiving ejector pins therein, which holes are, respectively, provided in movable mold halves.
Figure 2B:
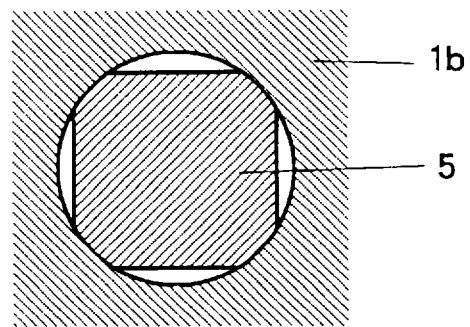
Figure 3:
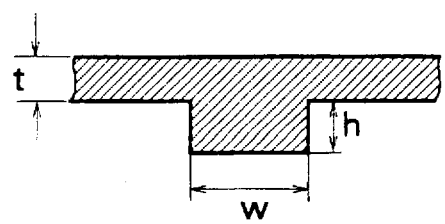
FIG. 3 is a diagrammatic, partial, cross-sectional view of one form of a shaped resin article having a locally protruded portion.

Generally, a space is necessarily formed between ejector pin 5 and the inner wall of ejector pin slide hole 5a formed in movable mold half 1b, so that the non-resin fluid can freely pass through the space. Therefore, there is, in principle, no need to provide a further space there. However, by changing the generally round shape of ejector pin 5 into the shape as shown in FIGS. 2(a) and 2(b), a more ample space can be provided for the pressurized non-resin fluid to enter more smoothly.

In either case, it is required that the space between ejector pin 5 and the inner wall of ejector pin slide hole 5a of movable mold half 1b does not permit the molten resin to intrude thereinto, but permits only the pressurized non-resin fluid to flow smoothly therethrough.

It is not necessary that the pressurized non-resin fluid be introduced from the side of movable mold half 1b. If desired, the pressurized non-resin fluid may be introduced from the side of fixed mold half 1a. However, in this case, it is necessary that an appropriate non-resin fluid supply route be provided in fixed mold half 1a. For example, a non-resin fluid supply route (having a similar structure to that of a route constituted by port 13, and horizontal and vertical non-resin fluid channels 12 and 12a indicated in FIG. 4) can be provided in fixed mold half 1a in a manner such that a non-resin fluid inlet, which opens to mold cavity 2, is provided in cavity inner wall 2a of fixed mold half 1a.

As mentioned above, in a preferred embodiment of the present invention, the pressurized non-resin fluid is introduced into the mold cavity on a side of the first surface of the molten resin mass, and the second surface of the molten resin mass is pressed against a cavity inner wall facing the second surface, so that a surface of a shaped resin article corresponding to the second surface of the molten resin mass has an improved surface finish. Therefore, the first and second surfaces of the molten resin mass, respectively, correspond to back and front surfaces of a shaped resin article.

After the pressurized non-resin fluid is injected, the molten resin in mold cavity 2 is cooled and solidified. Thereafter, the pressurized non-resin fluid is discharged from mold cavity 2. Subsequently, mold 1 is opened and then, the shaped resin article is ejected from movable mold half 1b.

The method of the present invention is especially useful in producing a shaped resin article having, on a side thereof corresponding to the first surface of the molten resin mass, a locally protruded portion at which the shaped resin article has an increased thickness (i.e., protruded portions, such as a rib, boss, and a combination thereof). Specifically, the method of the present invention is especially effective for producing a shaped article in which the wall thickness (indicated by character t in FIG. 3), the width of a local protrusion (indicated by character w in FIG. 3), and the height of the local protrusion (indicated by character h in FIG. 3) have the following relationships:

$$\frac{1}{2} t < w < 10t; \text{ and}$$

$$\frac{1}{2} t < h.$$

When a shaped resin article satisfying the above two formulae is produced by the conventional injection molding methods, it is very likely that the shaped resin article has sink marks at a portion of the flat-side surface of the shaped resin article, which portion corresponds to a reverse side portion relative to the locally protruded portion at which the shaped resin article has an increased thickness (the above-mentioned portion of the flat-side surface is hereinafter frequently referred to simply as the "increased thickness portion"). Further, in this case, it is very likely that uniform luster of the increased thickness portion of the shaped resin article cannot be obtained.

Figure 4:
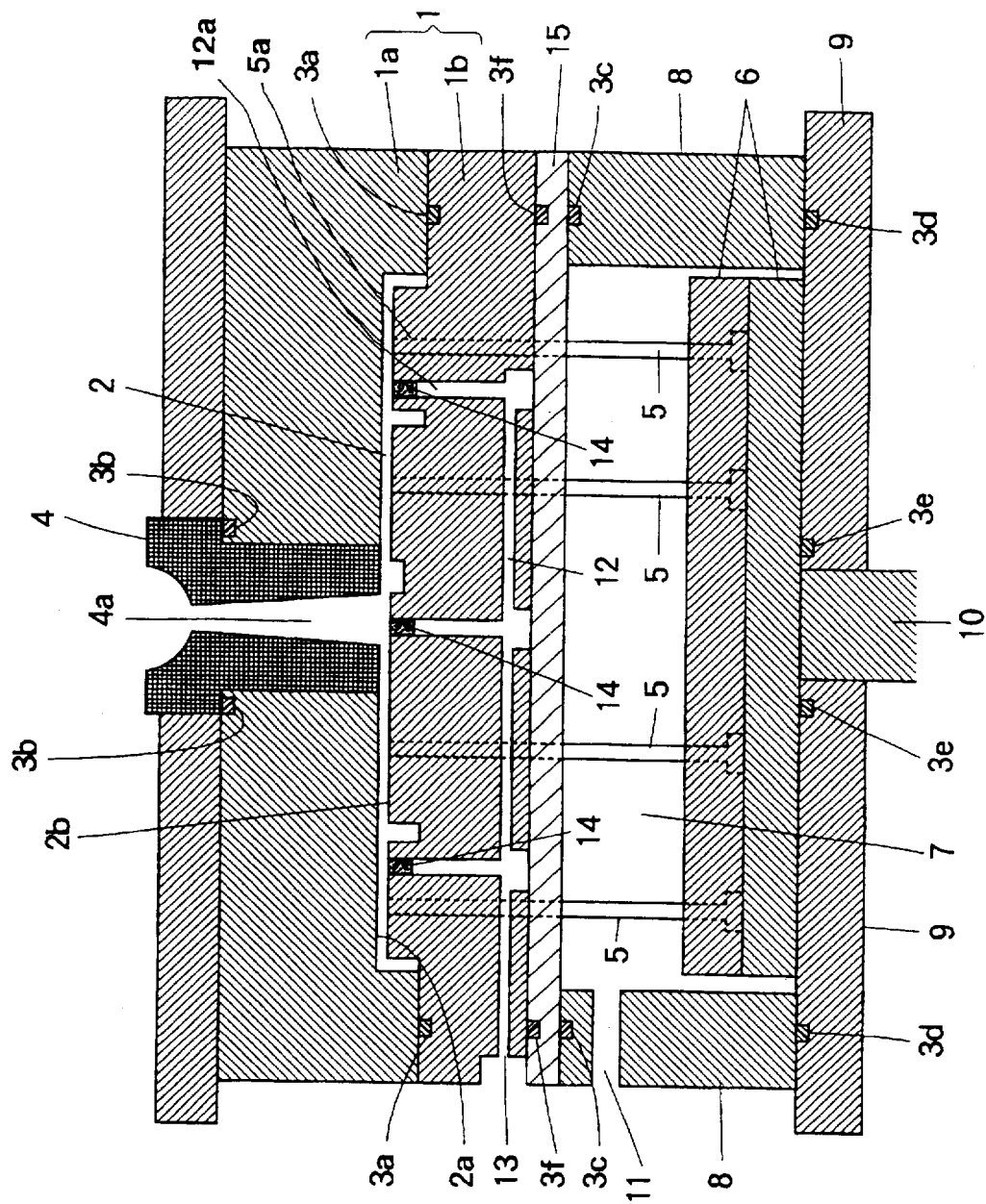
FIG. 4 is a diagrammatic cross-sectional view of another form of a sealed mold to be used in the present invention.

FIG. 4 is a diagrammatic cross-sectional view of another form of a sealed mold usable in the present invention.

The mold of FIG. 4 is similar to but different in several points from mold 1 of FIG. 1. One difference between these two molds resides in the fact that movable mold half 1b of mold 1 has therein an additional route for the introduction of a pressurized non-resin fluid into mold cavity 2, as depicted in FIG. 4. This additional route is constituted by port 13, horizontally extending channel 12 and vertically extending channel 12a. With respect to this additional route, a pressurized non-resin fluid supplied from a source (not shown) flows through port 13 and horizontal and vertical non-resin fluid channels 12 and 12a to enter mold cavity 2. Vertically extending non-resin fluid channel 12a has an open end in inner wall 2b of movable mold half 1b, the open end serving as a second inlet for the non-resin fluid. The upper open end portion of vertical non-resin fluid channel 12a has metallic porous material 14 fittedly inserted therein. It is required that metallic porous material 14 does not permit the molten resin to intrude thereinto, but permits the pressurized non-resin fluid to flow smoothly therethrough. Metallic porous material 14 is advantageously made of, for example, sintered granular stainless steel. The second inlet for a non-resin fluid communicates with a source for the non-resin fluid, and this source may be the same as or may be different from the other source which communicates with the other non-resin fluid inlet (first inlet) positioned at the upper open end of ejector pin slide hole 5a.

The other differences between mold 1 of FIG. 1 and mold 1 of FIG. 4 reside in that mold 1 of FIG. 4 has center plate 15 and seal means 3f. Seal means 3f seals at the interface between center plate 15 and movable mold half 1b. Center plate 15 is useful in that horizontal and vertical non-resin fluid channels (not shown) which are fluid-tightly connected to vertical non-resin fluid channel 12a and which lead to a port (not shown) which communicates with a source (not shown) for a non-resin fluid, can be provided within center plate 15. In such a case, port 13 and horizontal non-resin fluid channel 12 can be omitted.

In the case of mold 1 shown in FIG. 4, sealed chamber 7 can be omitted, if the space between an inner wall of each ejector pin slide hole 5a and a longitudinally extending periphery of each ejector pin 5 is satisfactorily sealed. However, it is generally difficult to seal the above-mentioned space while allowing ejector pin 5 to be slidable in ejector pin slide hole 5a. Therefore, even when a pressurized non-resin fluid is introduced only through port 13 and horizontal and vertical non-resin fluid channels 12 and 12a, it is preferred to provide sealed chamber 7. When the number of ejector pins 5 is relatively small, it is preferred to effect the introduction of the pressurized non-resin fluid by using both of the two routes, i.e., the route which involves sealed chamber 7 and the route which involves horizontal and vertical non-resin fluid channels 12 and 12a.

In mold 1 of FIG. 4, a solid metallic piece (not shown) may be employed in place of the above-mentioned metallic porous material 14, as long as an appropriate space for flowing a pressurized non-resin fluid can be provided between an inner wall of vertical non-resin fluid channel 12a and a vertically extending periphery of such a solid metallic piece. The solid metallic piece may have, for example, a cross-section similar to those of two forms of ejector pin 5 shown in FIGS. 2(a) and 2(b). If desired, the solid metallic piece may extend along the entire length of vertical non-resin fluid channel 12a.

Figure 5:
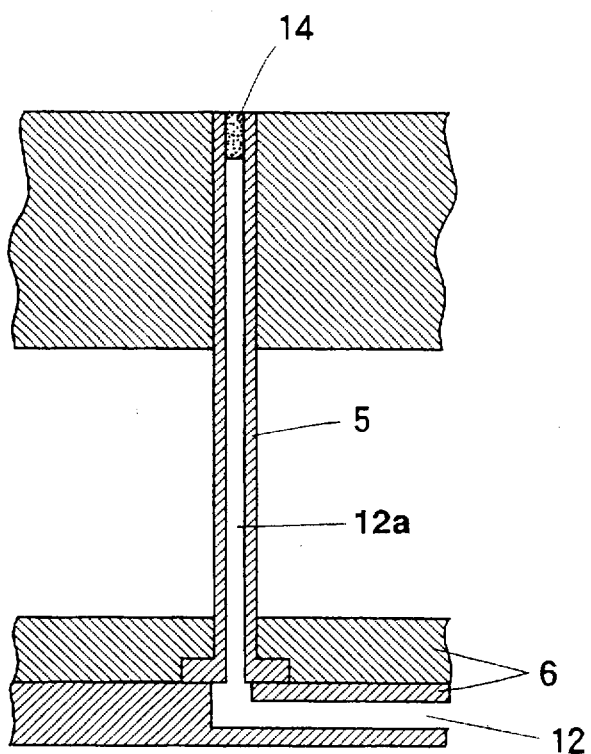
FIG. 5 is an enlarged longitudinal cross-sectional view of one form of an ejector pin having a non-resin fluid channel provided therein, shown with a part of the movable mold half and a part of an ejector pin-supporting plate.

FIG. 5 is an enlarged diagrammatic longitudinal cross-sectional view of another form of ejector pin 5 having a non-resin fluid channel provided therein, shown with a part of movable mold half 1b and a part of ejector pin-supporting plate 6. As depicted in FIG. 5, ejector pin 5 may be designed to have a hollow structure serving as a non-resin fluid channel 12a having metallic porous material 14 fittedly inserted in its open end portion on the side of mold cavity 2. In this case, non-resin fluid channel 12 is provided in ejector pin-supporting plate 6 as shown in FIG. 5. A pressurized non-resin fluid, supplied through horizontal non-resin fluid channel 12 inside ejector plate 6, is led through vertical non-resin fluid channel 12a formed within ejector pin 5 to flow into mold cavity 2.

In the method of the present invention, when the mold is made of a metallic material, it is preferred that a heat insulating material layer be provided on the cavity inner wall 2a, so that the second surface of the molten resin mass is pressed against cavity inner wall 2a through the heat insulating material layer provided thereon. With this preferred mode of the method of the present invention, the degree and uniformity of luster of the front surface (including the increased thickness portion) of a shaped resin article can be markedly improved. The reason for this advantageous effect resides in that the heat insulating material layer provided on cavity inner wall 2a serves to prevent the second surface of the molten resin mass from being rapidly cooled upon being contacted with cavity inner wall 2a, so that at the time when the second surface of the molten resin mass is pressed against cavity wall 2a under the force of the introduced pressurized non-resin fluid, a good fluidity of the second surface of the molten resin mass is not rapidly lost and, hence, the pressing effect of the pressurized non-resin fluid on the second surface can be markedly improved.

The above-mentioned heat insulating material layer is preferably made of a heat-resistant material having a thermal conductivity of from 60 to 0.06 $W \cdot m^{-1} k^{-1}$. Examples of representative heat insulating materials include polyimide, epoxy resin, phenol resin, polytetrafluoroethylene, and ceramics. The appropriate thickness of a heat insulating material layer varies depending on the type of the heat insulating material but, is preferably in the range from 10 to 500 µm, more preferably from 30 to 200 µm.

Alternatively, in the present invention, cavity inner wall 2a facing the second surface of the molten resin mass may preferably be heated prior to the injection of the molten resin in step (2). By this alternative mode of the method which involves a pre-heating of cavity inner wall 2a, the same advantageous effect as achieved with the above-mentioned preferred mode involving the use of a heat insulating material layer can be obtained. The heating of cavity inner wall 2a prior to the injection in step (2) can be effected by means of, for example, an inductor coil covered with an electrically insulating material.

Figure 6:
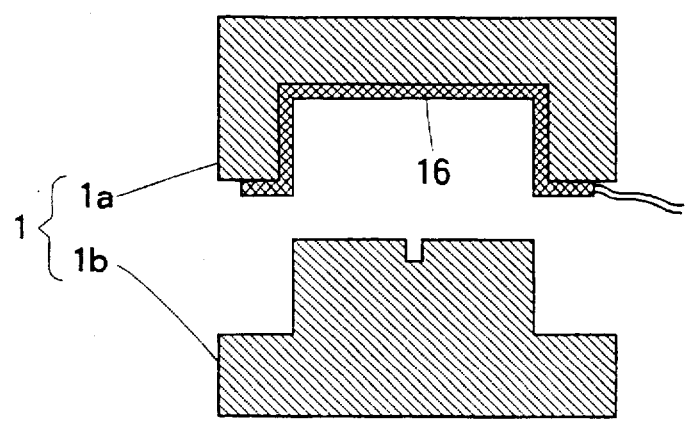
FIG. 6 is a diagrammatic view showing how a cavity inner wall facing a second surface of a molten resin mass is heated prior to the injection of a resin in a molten form.

FIG. 6 is a diagrammatic view showing how a cavity inner wall facing a second surface of a molten resin mass is heated prior to the injection of a resin in a molten form. As shown in FIG. 6, inductor coil 16 is closely contacted with cavity inner wall 2a, and induction heating of cavity inner wall 2a is effected. Since inductor coil 16 can selectively heat only cavity inner wall 2a instead of heating the entire movable mold half 1a, the cooling of the molten resin mass after the injection can be conducted efficiently.

It is preferable that the temperature for the above-mentioned heating of cavity inner wall 2a prior to the injection in step (2) be equal to or higher than the temperature at which the modulus of elasticity of the resin is lowered to a level which is 1/3 of the modulus of elasticity to be exhibited by the resin at room temperature.

The heating of cavity inner wall 2a by means of inductor coil 16 can also be effected in a manner different from the above. For example, inductor 16 can be embedded in fixed mold half 1a just below cavity inner wall 2a to be heated. Using this embedded inductor coil 16, cavity inner wall 2a can be heated from within movable mold half 1a prior to the injection of a resin. By employing the manner in which inductor coil 16 is embedded in movable mold half 1a, it is possible to effectively heat only a portion of cavity inner wall 2a corresponding to an increased thickness portion of a shaped resin article to be produced.

BEST MODE FOR CARRYING OUT THE INVENTION

The present invention will be described in more detail with reference to Examples, which should not be construed as limiting the scope of the present invention.

EXAMPLE 1

Using a sealed mold made of steel, a shaped resin article as shown in FIG. 7 was produced, and the surface finish condition of the shaped resin article was evaluated. The sealed mold employed had the same structure as shown in FIG. 1 except that the mold used did not have seal means 3b. The volume of the mold cavity was 202 $cm^3$.

Figure 7B:
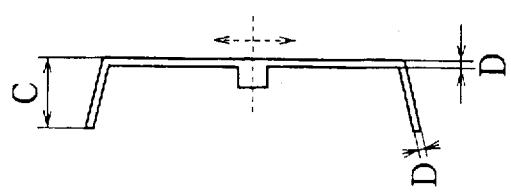
FIG. 7(b) is a cross-sectional view, taken along line VII—VII of FIG. 7(a)
Figure 7A:
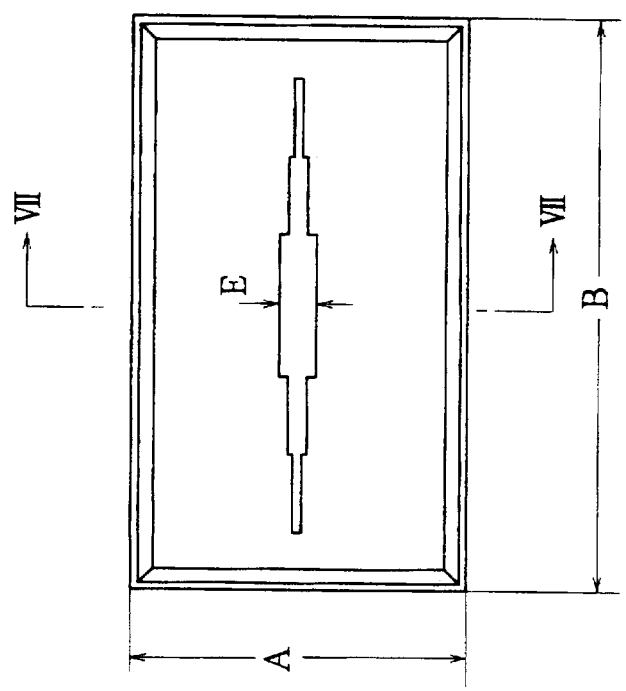
FIG. 7(a) is a diagrammatic plan view of one form of a shaped resin article.

The shaped resin article had the following dimensional characteristics: a width [indicated by character A in FIG. 7(a)] of 200 mm, a length [indicated by character B in FIG. 7(a)] of 300 mm, a depth [indicated by character C in FIG. 7(b)] of 40 mm, and a wall thickness [indicated by character D in FIG. 7(b)] of 2.5 mm. The shaped article had, on a back surface thereof, a rib which had a width [indicated by character E in FIG. 7(a)] of 6 mm and a height of 10 mm.

The procedure conducted in Example 1 is described in detail below.

The conditions for the injection molding were as follows.

Resin: Asahi Chemical Polystyrene (tradename of a high impact polystyrene, manufactured and sold by Asahi Kasei Kogyo Kabushiki Kaisha, Japan, having a specific gravity of 1.05 as measured at room temperature under atmospheric pressure)

Volume of the mold cavity: 202 cm$^3$

Cylinder temperature: 230° C.

Temperature of the mold: 45° C.

Injection pressure: 50 kg/cm$^2$ (gauge pressure of the injection molding machine)

Resin pressure in the mold cavity: 500 kg/cm$^2$ (maximum value)

Pressurized non-resin fluid: $N_2$ (nitrogen gas)

Pressure of the pressurized non-resin fluid: 40 kg/cm$^2$ (gauge pressure)

Cooling time (period of time as measured from completion of the injection of the resin): 50 seconds In Example 1, $W_1$, $W_x$ and $W_2$ in formula (I) were as follows:

$W_1$: 200 g $W_x$: 6 g, and $W_2$: 206 g

In Example 1, Y in formula (II) was 0.43, and therefore, the excess filling ratio was 43%.

The injection molding was conducted as follows.

The high impact polystyrene was charged into the cylinder of an injection molding machine through a hopper thereof, and was heated in the cylinder (cylinder temperature: 230° C.), thereby obtaining a molten resin. Then, 206 g of the molten resin (the excess filling ratio: 43%) was injected into the mold cavity (volume: 202 cm$^3$; temperature of the mold: 45° C.) with an injection pressure of 50 kg/cm$^2$ (gauge pressure). After completion of the injection of the molten resin, a pressurized nitrogen gas (gauge pressure: 40 kg/cm$^2$) which was supplied from a source therefor (pressure tank) was immediately introduced into the mold cavity 2 through port 11, sealed chamber 7 and the non-resin fluid channel formed between an inner wall of each ejector pin slide hole 5a and a longitudinally extending periphery of each ejector pin 5. Specifically, the gas valve of the pressure tank was opened for 5 seconds and then, the valve was closed. After the closing of the gas valve, the pressurized $N_2$ gas was retained in the mold cavity for 20 seconds and then, withdrawn from the mold cavity. The molten resin in the mold cavity was cooled for 50 seconds from completion of the injection, to thereby allow the molten resin to solidify. Next, the movable mold half 1b was separated from the fixed mold half 1a to open the mold. The pushing rod 10 was moved to push the ejector pin-supporting plate, so that the ejector pins served to eject the shaped article from movable mold half 1b. The shaped resin article was visually observed to check whether or not burrs were present along the parting line of the mold. Subsequently, the shaped article was allowed to stand for three days at room temperature under atmospheric pressure. Then, the front surface of the shaped resin article (corresponding to the second surface of the molten resin mass) was tested for occurrence of sink marks by means of a surface roughness tester (SURFTEST-500, manufactured and sold by Mitutoyo Corporation, Japan). That is, displacement on the front surface of the shaped resin article in a direction orthogonal thereto was measured, and was taken as the depth (μm) of a sink mark. The measurement of displacement was effected with respect to a portion [as indicated by a broken line with arrows in FIG. 7(b)] of the front surface around the axis of the rib formed on the back surface. Results are shown in Table 1.

EXAMPLES 2 THROUGH 6

Figure 8:
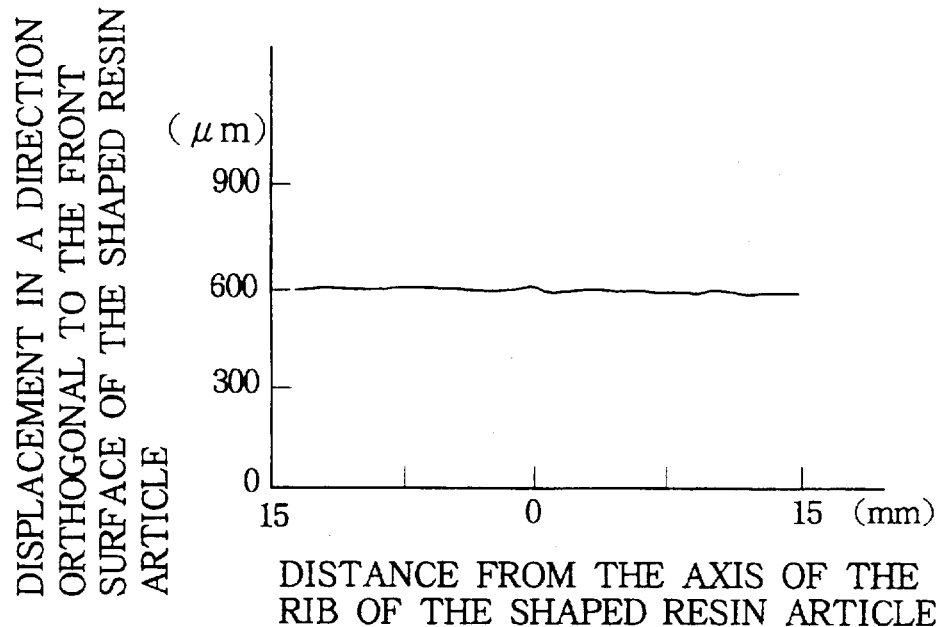
FIG. 8 is a graph showing the surface finish condition of the shaped resin article obtained in Example 3, in which the excess filling ratio is 57%.

Substantially the same procedure as in Example 1 was repeated except that the weight of the resin to be injected was changed by varying the excess filling ratio, as indicated in Table 1. Results are shown in Table 1. The surface finish condition of the shaped resin article obtained in Example 3 is shown in the graph of FIG. 8.

COMPARATIVE EXAMPLES 1 THROUGH 7

Figure 9:
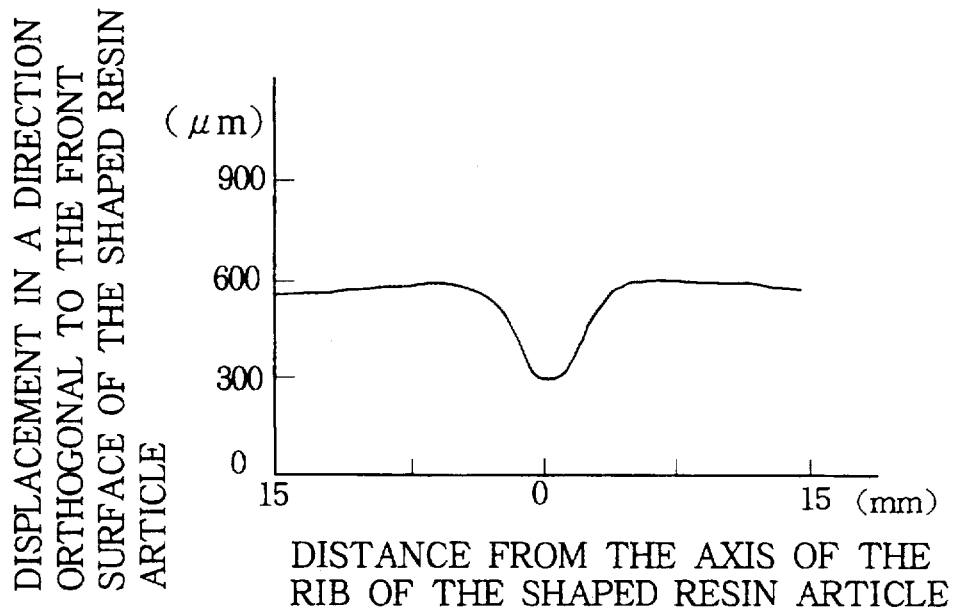
FIG. 9 is a graph showing the surface finish condition of the shaped resin article obtained in Comparative Example 3, in which the excess filling ratio is 0%.

Substantially the same procedure as in Example 1 was repeated except that the weight of the resin to be injected was changed by varying the excess filling ratio, as indicated in Table 1. Results are shown in Table 1. The surface finish condition of the shaped resin article obtained in Comparative Example 3 is shown in the graph of FIG. 9.

As is apparent from Table 1, in Examples 1 to 6 in which the excess filling ratio is within the range of 30 to 90%, the displacement (depth of sink mark) was as small as 5 to 55 μm, indicating that a sink mark cannot be visually observed. Further in Examples 1 to 6, the occurrence of burrs was not observed.

As is also apparent from Table 1, in Comparative Examples 1 to 6 in which the excess filling ratio is less than 30%, the depth of the sink mark is as large as 70 μm to more than 1,000 μm, indicating that the sink mark is clearly observable by the naked eye. Further, in Comparative Example 7 in which the excess filling ratio is 93%, the occurrence of burrs was observed.

COMPARATIVE EXAMPLE 8

(Resin pressure method)

Injection molding, using the resin pressure method, was conducted by the following procedure to produce the shaped resin article shown in FIG. 7. In this experiment, a non-sealed mold was used which had the same structure as that of the mold of FIG. 1 except that seal means 3a and 3b were not present. With respect to the type of resin employed, the cylinder temperature, the temperature of the mold, the injection pressure, and the pressure of the molten resin in the cavity, the same conditions as employed in Example 1 were employed.

The resin was charged into the cylinder and heated therein to obtain a molten resin. 210 g of the molten resin was injected into the mold cavity in the same manner as in Example 1. Following the injection, a secondary pressure described below was applied to the molten resin in the mold cavity for 10 seconds.

Secondary pressure: 50 kg/cm$^2$ (gauge pressure of the molding machine), which corresponds to a resin pressure of about 400 kg/cm$^2$.

Figure 10:
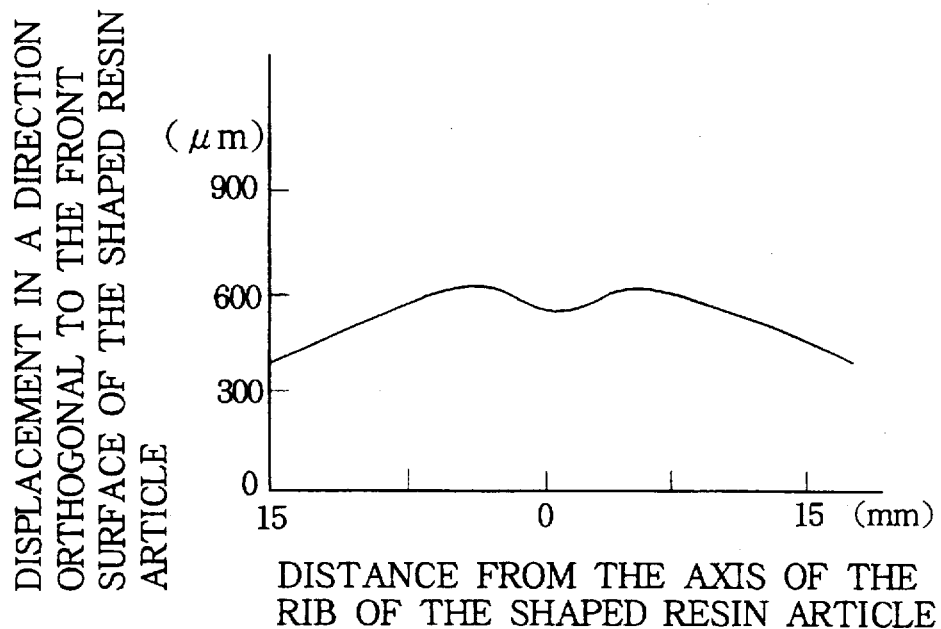
FIG. 10 is a graph showing the surface finish condition of the shaped article obtained in Comparative Example 8, in which the resin pressure method was employed.

After the molten resin was solidified, the mold was opened and the obtained shaped resin article was removed from the mold cavity. With respect to the shaped resin article, the occurrence of burrs and sink marks was evaluated in the same manner as in Example 1. Results are shown in Table 1. The surface finish condition of the shaped resin article obtained in Comparative Example 8 is shown in the graph of FIG. 10.

COMPARATIVE EXAMPLE 9

Substantially the same procedure as in Comparative Example 8 was repeated except that the weight of the resin to be injected was changed to 211 g. Results are shown in Table 1.

As shown in Table 1, in Comparative Example 8, in which optimum molding conditions were selected for preventing the occurrence of burrs, the depth of the sink mark of the shaped resin article was as large as 75 μm, indicating that the sink mark was visually easily observable. In Comparative Example 9, the depth of the sink mark was as large as 75 μm and, in addition, the occurrence of burrs was observed.

EXAMPLE 7

Substantially the same procedure as in Example 3 was repeated except that a heat insulating material layer was provided on the cavity inner wall 2a, so that the second surface of the molten resin mass was pressed against the cavity inner wall 2a through the heat insulating material layer provided thereon. Illustratively stated, as the heat insulating material layer, a polyimide film having a thickness of 50 μm was employed, and this film was attached, by means of an adhesive tape, to the cavity inner wall 2a facing the second surface of the molten resin mass corresponding to the front surface of a shaped resin article to be produced.

With respect to the front surface of the obtained shaped resin article, the degree and uniformity of luster were evaluated.

The degree of luster was measured by a gloss meter (Digital Variable Gloss Meter, manufactured and sold by Suga Test Instrument Co., Japan). Criteria of evaluation of uniformity of luster were as follows.

x: Large non-uniformity in luster is observed and/or a distinct flow mark is observed.

Δ: Some non-uniformity in luster is observed and/or a flow mark is observed.

○: Uniform luster is observed over the entire area of the front surface of a shaped resin article, and no flow mark is observed.

Results are shown in Table 2.

REFERENTIAL EXAMPLE

With respect to the shaped resin article obtained in Example 3, the degree and uniformity of luster were evaluated in the same manner as in Example 7. Results are shown in Table 2.

COMPARATIVE EXAMPLE 10

With respect to the shaped resin article obtained in Comparative Example 8, the degree and uniformity of luster were evaluated in the same manner as in Example 7. Results are shown in Table 2.

EXAMPLE 8

Substantially the same procedure as in Example 3 was repeated except that the cavity inner wall 2a facing the second surface of the molten resin mass was heated prior to the injection in step (2). The heating of the cavity inner wall 2a was effected by means of an inductor coil covered with an electrically insulating material. As shown in FIG. 6, the inductor coil was closely contacted with the cavity inner wall 2a and induction heating of the cavity inner wall 2a was effected. After the cavity inner wall 2a was heated to about 120° C., the inductor coil was removed, and the injection of a molten resin was immediately conducted.

With respect to the front surface of the obtained shaped resin article, the degree and uniformity of luster were evaluated in the same manner as in Example 7. Results are shown in Table 2.

As is apparent from Table 2, when a heat insulating material layer is provided on the cavity inner wall 2a, facing the second surface of the molten resin mass, as in Example 7, or when the cavity inner wall 2a facing the second surface of the molten resin mass is heated prior to the injection in step (2), as in Example 8, the degree and uniformity of luster are markedly improved.

TABLE 1

|  | Weight of injected resin (g) | Wx (g) | Excess filling ratio (%) | Depth of sink mark (μm) | Occurrence of burrs |
|---|---|---|---|---|---|
| Comparative Example 1 | 196 | — | — | ≧1000 | None |
| Comparative Example 2 | 198 | — | — | ≧1000 | None |
| Comparative Example 3 | 200 | 0 | 0 | ≧1000 | None |
| Comparative Example 4 | 201 | 1 | 7 | 200 | None |
| Comparative Example 5 | 202 | 2 | 14 | 82 | None |
| Comparative Example 6 | 204 | 4 | 29 | 70 | None |
| Example 1 | 206 | 6 | 43 | 55 | None |
| Example 2 | 207 | 7 | 50 | 18 | None |
| Example 3 | 208 | 8 | 57 | 10 | None |
| Example 4 | 210 | 10 | 71 | 5 | None |
| Example 5 | 211 | 11 | 79 | 5 | None |
| Example 6 | 212 | 12 | 86 | 5 | None |
| Comparative Example 7 | 213 | 13 | 93 | 5 | Observed |
| Comparative Example 8 | 210 | 10 | 71 | 75 | None |
| Comparative Example 9 | 211 | 11 | 79 | 75 | Observed |

Note Examples 1 to 6 and Comparative Examples 1 to 7 are arranged so that the excess filling ratios are successively shown from smaller to larger values.

TABLE 2

|  | Degree of luster (%) | | | |
| --- | --- | --- | --- | --- |
|  | Depth of sink mark (μm) | Increased thickness portion* | Around increase thickness portion | Uniformity of luster |
| Example 7 | 8 | 98 | 97 | ○ |
| Referential Example | 10 | 35 | 31 | Δ |
| Comparative Example 10 | 75 | 43 | 28 | X |
| Example 8 | 5 | 95 | 96 | ○ |

Note "Increased thickness portion" means a portion of the front surface corresponding to the rib on the back surface

We claim:

1. A method for the non-resin fluid-assisted injection molding of a resin to produce a shaped resin article having an improved surface finish, which comprises:

(1) providing a mold comprising a fixed mold half and a movable mold half mating with said fixed mold half to thereby provide a mold cavity defined by an inner wall of the fixed mold half and an inner wall of the movable mold half, said mold cavity communicating with a resin inlet and with a non-resin fluid inlet, said mold being sealed to prevent a non-resin fluid from leaking out of the mold when the non-resin fluid is introduced to said mold cavity;

(2) injecting a resin in a molten form, under preselected temperature and pressure conditions for the injection, into the mold cavity of said mold through said resin inlet in an amount ($W_2$) represented by the following formula (i):

$$W_2(g) = W_1(g) + W_x(g) \quad (I)$$

wherein:

$W_1$ is defined by the formula $W_1 = \rho \cdot V_1$ in which $\rho$ is the density (g/cm$^3$) of the resin as measured at room temperature under atmospheric pressure, and $V_1$ is defined by the formula $V_1 = V_0 \cdot (1-x)$ in which $V_0$ is the volume (cm$^3$) of the mold cavity, and x is the volume shrinkage ratio of the resin, said volume shrinkage ratio being defined by the formula $$\frac{V_a - V_b}{V_a}$$

in which $V_a$ is the volume (cm$^3$) of a predetermined weight of the resin in a molten form under said preselected temperature and pressure conditions for the injection, and $V_b$ is the volume (cm$^3$) of the predetermined weight of the resin in a solidified form upon cooling to room temperature; and $W_x$ is defined by formula (II):

$$W_x = Y \cdot (V_0 - V_1) \quad (II)$$

wherein ρ is as defined above, Y is from 0.3 to 0.9, and $V_0$ and $V_1$ are as defined above, thereby effecting an excess filling of said mold cavity with the molten resin to form a molten resin mass having opposite, first and second surfaces respectively facing opposite inner walls of said cavity; and (3) introducing a pressurized non-resin fluid, which is inert to said resin, into said mold cavity on a side of said first surface of the molten resin mass to thereby press said second surface of the molten resin mass against the cavity inner wall facing said second surface.

2. The method according to claim 1, wherein said Y in formula (II) is from 0.5 to 0.8.

3. The method according to claim 1 or 2, which is used for producing a shaped resin article having, on a side thereof corresponding to the first surface of said molten resin mass, a locally protruded portion at which the shaped resin article has an increased thickness.

4. The method according to claim 1 or 2, wherein on a side of said movable mold half, remote from the mold cavity, there is provided a sealed chamber which contains an ejector pin-supporting plate and a plurality of ejector pins each securely connected at its rear end to one surface of the ejector pin-supporting plate on a side of said movable mold half, and the movable mold half has a plurality of ejector pin slide holes, respectively, slidably receiving said plurality of ejector pins therein, said sealed chamber communicating fluid-tightly with the mold cavity through a non-resin fluid channel formed between an inner wall of each ejector pin slide hole and a longitudinally extending periphery of each ejector pin, and communicating with a source for the pressurized non-resin fluid, wherein said pressurized non-resin fluid is introduced into and withdrawn from the mold cavity through said sealed chamber and the non-resin fluid channel.

5. The method according to claim 4, wherein said mold cavity is further provided with a second inlet for a non-resin fluid.

6. The method according to claim 1 or 2, wherein said first and second surfaces of the molten resin mass, respectively, correspond to back and front surfaces of a shaped resin article.

7. The method according to claim 1 or 2, wherein said mold is made of a metallic material.

8. The method according to claim 7, wherein said second surface of the molten resin mass is pressed against said cavity inner wall facing said second surface through a heat insulating material layer provided on said cavity inner wall.

9. The method according to claim 8, wherein said heat insulating material layer is made of a heat-resistant material having a thermal conductivity of from 60 to 0.06 W·m$^{-1}$k$^{-1}$.

10. The method according to claim 7, wherein said cavity inner wall facing the second surface of the molten resin mass is heated prior to the injection in step (2).

11. The method according to claim 10, wherein the temperature for heating said cavity inner wall facing the second surface of the molten resin mass is equal to or higher than the temperature at which the modulus of elasticity of the resin is lowered to a level which is ⅕ of the modulus of elasticity to be exhibited by the resin at room temperature.

* * * * *